United States Patent
Fulton et al.

(10) Patent No.: US 9,358,663 B2
(45) Date of Patent: Jun. 7, 2016

(54) SYSTEM AND METHODS OF REMOVING A MULTI-LAYER COATING FROM A SUBSTRATE

(71) Applicant: General Electric Company, Schenectady, NY (US)

(72) Inventors: Blake Allen Fulton, Simpsonville, SC (US); Michael Anthony DePalma, Simpsonville, SC (US); Craig Lowell Sarratt, Taylors, SC (US); Ryan Jeffrey Cardillo, Greenville, SC (US)

(73) Assignee: General Electric Company, Schenectady, NY (US)

( * ) Notice: Subject to any disclaimer, the term of this patent is extended or adjusted under 35 U.S.C. 154(b) by 219 days.

(21) Appl. No.: 14/254,052

(22) Filed: Apr. 16, 2014

(65) Prior Publication Data

US 2015/0298288 A1  Oct. 22, 2015

(51) Int. Cl.

| | |
|---|---|
| *B24B 49/02* | (2006.01) |
| *B08B 1/04* | (2006.01) |
| *B24B 19/22* | (2006.01) |
| *B24B 27/033* | (2006.01) |
| *B23P 6/00* | (2006.01) |
| *B24B 49/00* | (2012.01) |
| *B24B 7/20* | (2006.01) |
| *B24B 19/14* | (2006.01) |

(Continued)

(52) U.S. Cl.
CPC . *B24B 49/02* (2013.01); *B08B 1/04* (2013.01); *B23P 6/00* (2013.01); *B23P 6/002* (2013.01); *B24B 7/20* (2013.01); *B24B 19/14* (2013.01); *B24B 19/22* (2013.01); *B24B 27/033* (2013.01); *B24B 49/00* (2013.01); *B24B 49/006* (2013.01); *B24B 49/16* (2013.01); *F01D 5/005* (2013.01); *F01D 5/288* (2013.01)

(58) Field of Classification Search
CPC ................................ B24B 49/00; B24B 49/02
USPC .............................. 451/57, 58, 28, 5, 8, 9, 10
See application file for complete search history.

(56) References Cited

U.S. PATENT DOCUMENTS

| 5,704,826 A | 1/1998 | De Luis Vizcaino |
| 6,699,101 B2 | 3/2004 | Annigeri et al. |

(Continued)

FOREIGN PATENT DOCUMENTS

| EP | 0861919 B1 | 9/1998 |
| EP | 1251191 B1 | 10/2002 |

OTHER PUBLICATIONS

European Search Report and Opinion issued in connection with corresponding EP Application No. 15162441.8 on Aug. 24, 2015.

*Primary Examiner* — Robert Rose
(74) *Attorney, Agent, or Firm* — Armstrong Teasdale LLP

(57) ABSTRACT

A system for use in removing a multi-layer coating from a substrate is provided. The multi-layer coating includes a first coating applied to the substrate and a second coating applied over the first coating. The first coating is formed from a first material and the second coating is formed from a second material different from the first material. The system includes a grinding mechanism configured to remove the multi-layer coating from the substrate, and a controller coupled in communication with the grinding mechanism. The controller is configured to position the grinding mechanism against the multi-layer coating, initiate a first removal mode that directs the grinding mechanism to traverse across the substrate, monitor a variable operating parameter of the grinding mechanism during the first removal mode, and evaluate a value of the variable operating parameter against a predetermined threshold to determine whether the second coating has been removed from the substrate.

20 Claims, 3 Drawing Sheets

(51) Int. Cl.
  *B24B 49/16* (2006.01)
  *F01D 5/00* (2006.01)
  *F01D 5/28* (2006.01)

(56) References Cited

U.S. PATENT DOCUMENTS

| | | |
|---|---|---|
| 6,905,396 B1 | 6/2005 | Miller et al. |
| 6,955,308 B2 | 10/2005 | Segrest et al. |
| 7,264,538 B2 * | 9/2007 | Hood ................... B08B 1/04 451/28 |
| 7,544,112 B1 * | 6/2009 | Miller ................... B24C 1/086 451/10 |
| 8,299,743 B2 | 10/2012 | Abeta et al. |
| 8,568,197 B2 * | 10/2013 | Voice ................... B24C 1/00 451/11 |
| 8,622,784 B2 | 1/2014 | Miller et al. |
| 2011/0103968 A1 | 5/2011 | Hoebel et al. |

* cited by examiner

SYSTEM AND METHODS OF REMOVING A MULTI-LAYER COATING FROM A SUBSTRATE

BACKGROUND

The present disclosure relates generally to turbine components having coatings applied thereon and, more specifically, systems and methods of automated removal of coatings from turbine components.

Modern gas turbine engines operate in high temperature environments. Components in a gas turbine engine (e.g., turbine buckets, nozzles, airfoils, and shrouds) often include thermal barrier coating (TBC) systems that protect the component, and that enables the engine to operate more efficiently at higher temperatures. Known TBC systems must have a low thermal conductivity, must strongly adhere to the component, and must remain adherent throughout many heating and cooling cycles. As such, TBC systems generally include a metallic bond coating that facilitates adhering a thermally-insulating ceramic coating to the component. Thermally-insulating ceramic coatings are generally formed from metal oxides such as zirconia ($ZrO_2$) partially or fully stabilized by yttria ($Y_2O_3$), magnesia (MgO) or other oxides, and metallic bond coatings are generally formed from oxidation-resistant diffusion coatings such as a diffusion aluminide or platinum aluminide, or an oxidation-resistant alloy such as MCrAlY (where M is iron, cobalt and/or nickel).

At least some known gas turbine engine components have a predetermined service life. However, the components may be refurbished by removing a remaining TBC system therefrom, and by reapplying a new TBC system to the components. Several known processes are generally used for removing remaining TBC systems from turbine components. Exemplary processes include, but are not limited to, mechanical grinding, acid stripping, and water jet blasting. However, without knowing the precise thickness of the remaining TBC system, it may be difficult to determine a duration in which to apply the removal process while also reducing substrate material removal. Moreover, such known processes generally must be monitored and the components manually inspected to determine whether the removal process should continue.

BRIEF DESCRIPTION

In one aspect, a system for use in removing a multi-layer coating from a substrate is provided. The multi-layer coating includes at least one layer of a first coating applied to the substrate and at least one layer of a second coating applied over the first coating. The first coating is formed from a first material and the second coating is formed from a second material different from the first material. The system includes a grinding mechanism configured to remove the multi-layer coating from the substrate, and a controller coupled in communication with the grinding mechanism. The controller is configured to position the grinding mechanism against the multi-layer coating, initiate a first removal mode that directs the grinding mechanism to traverse across the substrate, monitor a variable operating parameter of the grinding mechanism during the first removal mode, and evaluate a value of the variable operating parameter against a predetermined threshold to determine whether the second coating has been removed from the substrate.

In another aspect, a method of removing a multi-layer coating from a substrate is provided. The multi-layer coating includes at least one layer of a first coating applied to the substrate and at least one layer of a second coating applied over the first coating. The first coating is formed from a first material and the second coating is formed from a second material different from the first material. The method includes positioning a grinding mechanism against the multi-layer coating, the grinding mechanism configured to remove the multi-layer coating from the substrate, initiating a first removal mode that directs the grinding mechanism to traverse across the substrate, monitoring a variable operating parameter of the grinding mechanism during the first removal mode, and evaluating a value of the variable operating parameter against a predetermined threshold to determine whether the second coating has been removed from the substrate.

In yet another aspect, a non-transitory computer-readable medium having computer-executable instructions embodied thereon for use in removing a multi-layer coating from a substrate is provided. The multi-layer coating includes at least one layer of a first coating applied to the substrate and at least one layer of a second coating applied over the first coating. The first coating is formed from a first material and the second coating is formed from a second material different from the first material. When executed by a controller, the computer-executable instructions cause the controller to position a grinding mechanism against the multi-layer coating, initiate a first removal mode that directs the grinding mechanism to traverse across the substrate, monitor a variable operating parameter of the grinding mechanism during the first removal mode, and evaluate a value of the variable operating parameter against a predetermined threshold to determine whether the second coating has been removed from the substrate.

DETAILED DESCRIPTION

Embodiments of the present disclosure relate to systems and methods of removing a multi-layer coating from a substrate. More specifically, the systems and methods described herein facilitate detecting when layers of coating material are removed from the substrate by continuously monitoring a variable operating parameter of a grinding mechanism as it removes the multi-layer coating. In the exemplary embodiment, the multi-layer coating is formed from at least one layer of a first coating and at least one layer of a second coating. The first and second coatings are formed from different materials such that as the grinding mechanism removes the multi-layer coating, an evaluation of when each layer is being engaged by the grinding mechanism is determined based on a value of the variable operating parameter. As such, the technical effect of the systems and methods described herein includes automated coating removal that facilitates increasing the accuracy of coating removal from substrates.

Figure 1:
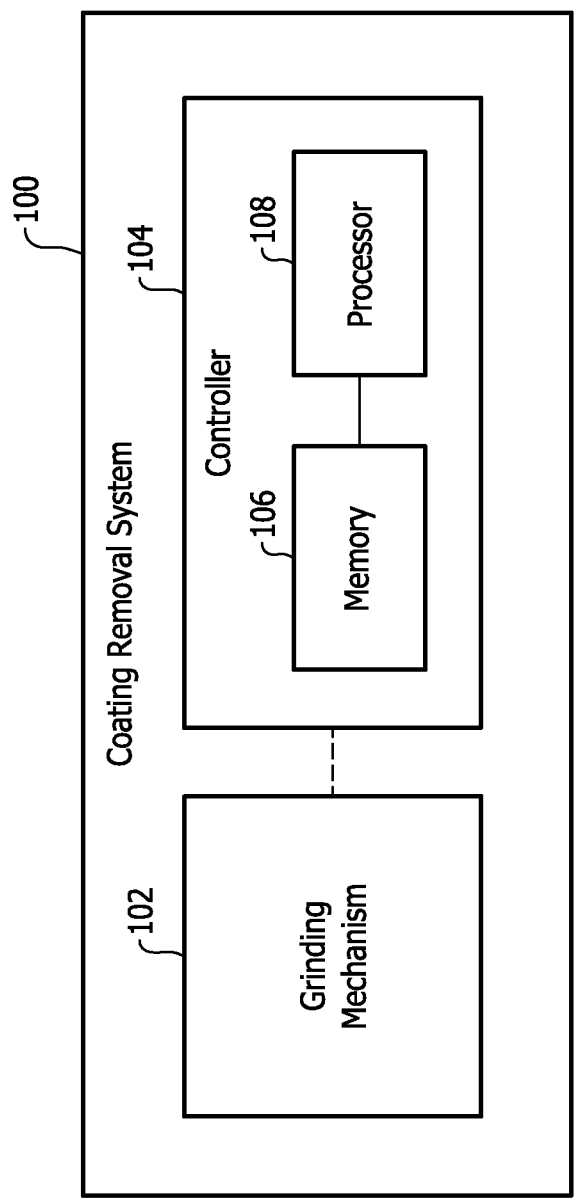
FIG. 1 is a block diagram of an exemplary coating removal system.

FIG. 1 is a block diagram of an exemplary coating removal system 100. In the exemplary embodiment, coating removal system 100 includes a grinding mechanism 102 and a controller 104 coupled in communication with grinding mechanism 102. Grinding mechanism 102 is operable to mechanically remove a multi-layer coating from a substrate (each not shown in FIG. 1). In some embodiments, the substrate is a gas turbine engine component such as, but not limited to, a bucket, a nozzle, an airfoil, and/or a shroud tile.

Controller 104 includes a memory 106 (i.e., a non-transitory computer-readable medium) and a processor 108 coupled to memory 106 for executing programmed instructions. Processor 108 may include one or more processing units (e.g., in a multi-core configuration) and/or include a cryptographic accelerator (not shown). Controller 104 is programmable to perform one or more operations described herein by programming memory 106 and/or processor 108. For example, processor 108 may be programmed by encoding an operation as executable instructions and providing the executable instructions in memory 106.

Processor 108 may include, but is not limited to, a general purpose central processing unit (CPU), a microcontroller, a reduced instruction set computer (RISC) processor, an open media application platform (OMAP), an application specific integrated circuit (ASIC), a programmable logic circuit (PLC), and/or any other circuit or processor capable of executing the functions described herein. The methods described herein may be encoded as executable instructions embodied in a computer-readable medium including, without limitation, a storage device and/or a memory device. Such instructions, when executed by processor 108, cause processor 108 to perform at least a portion of the functions described herein. The above examples are exemplary only, and thus are not intended to limit in any way the definition and/or meaning of the term processor.

Memory 106 is one or more devices that enable information such as executable instructions and/or other data to be stored and retrieved. Memory 106 may include one or more computer-readable media, such as, without limitation, dynamic random access memory (DRAM), synchronous dynamic random access memory (SDRAM), static random access memory (SRAM), a solid state disk, and/or a hard disk. Memory 106 may be configured to store, without limitation, executable instructions, operating systems, applications, resources, installation scripts and/or any other type of data suitable for use with the methods and systems described herein.

Instructions for operating systems and applications are located in a functional form on non-transitory memory 106 for execution by processor 108 to perform one or more of the processes described herein. These instructions in the different implementations may be embodied on different physical or tangible computer-readable media, such as memory 106 or another memory, such as a computer-readable media (not shown), which may include, without limitation, a flash drive and/or thumb drive. Further, instructions may be located in a functional form on non-transitory computer-readable media, which may include, without limitation, smart-media (SM) memory, compact flash (CF) memory, secure digital (SD) memory, memory stick (MS) memory, multimedia card (MMC) memory, embedded-multimedia card (e-MMC), and micro-drive memory. The computer-readable media may be selectively insertable and/or removable from controller 104 to permit access and/or execution by processor 108. In an alternative implementation, the computer-readable media is not removable.

Figure 2:
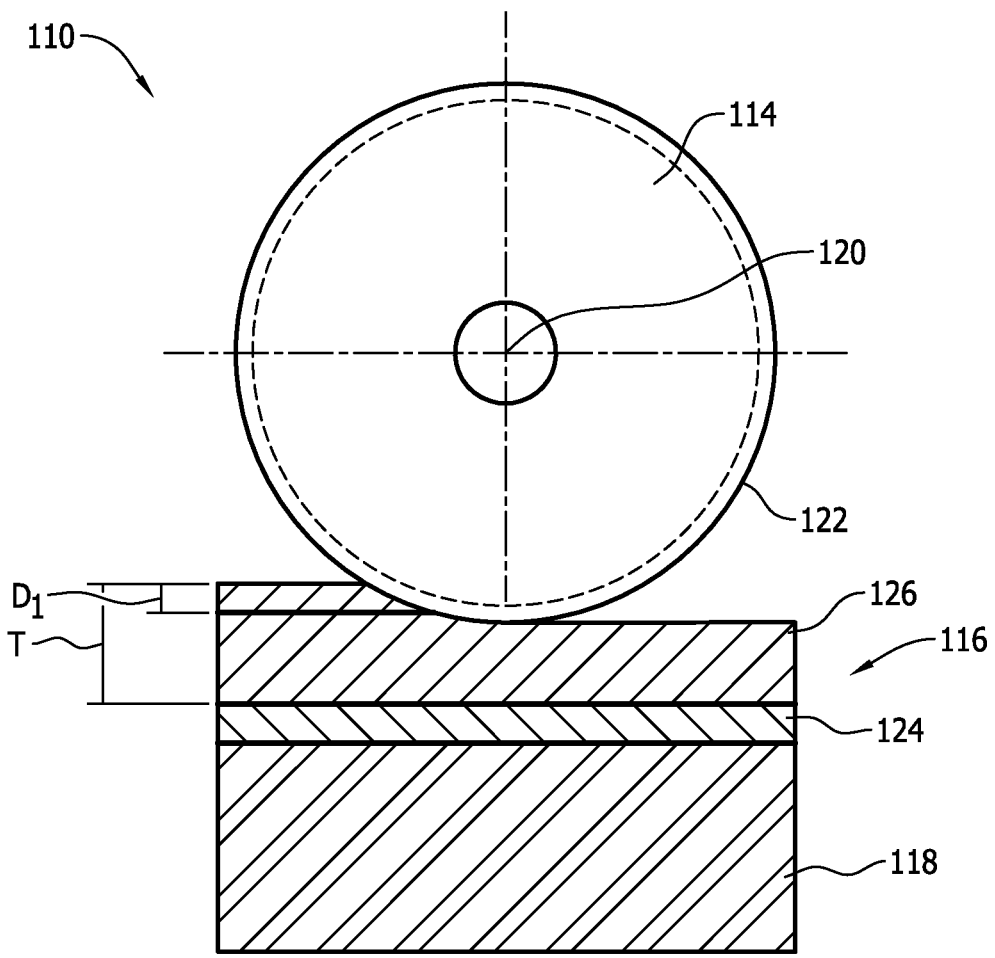
FIG. 2 is a schematic illustration of the coating removal system shown in FIG. 1 in a first removal mode.
Figure 3:
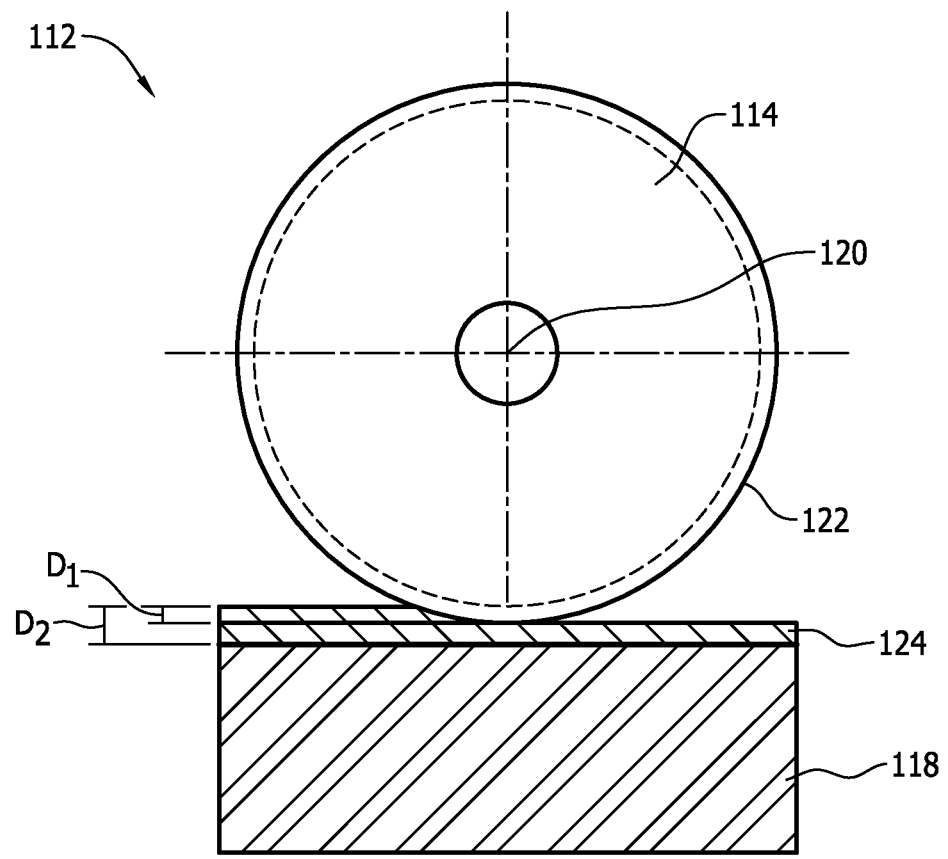
FIG. 3 is a schematic illustration of the coating removal system shown in FIG. 1 in a second removal mode.

FIG. 2 is a schematic illustration of coating removal system 100 in a first removal mode 110, and FIG. 3 is a schematic illustration of coating removal system 100 in a second removal mode 112. In the exemplary embodiment, grinding mechanism 102 includes a grinding wheel 114 positioned against multi-layer coating 116 and operable to mechanically remove multi-layer coating 116 from substrate 118. Grinding wheel 114 has a substantially circular shape and rotates about a central axis 120 thereof to grind against and remove multi-layer coating 116 from substrate 118. Specifically, grinding wheel 114 includes an outer surface 122 that contacts multi-layer coating 116. Outer surface 122 may be formed from abrasive material such as, but not limited to, vitrified bonded abrasive material (i.e., aluminum oxide and silicon carbide), vitrified bonded cubic boron nitride (CBN), direct-plated super-abrasive material, and resin-bonded abrasive material. In an alternative embodiment, grinding mechanism 102 may be any mechanical removal mechanism that enables coating removal system 100 to function as described herein.

Multi-layer coating 116 includes at least one layer 124 of a first coating applied to substrate 118, and at least one layer 126 of a second coating applied to the first coating. The first coating is formed from a first material and the second coating is formed from a second material different from the first material. In the exemplary embodiment, the first coating is formed from a metallic bond coat material, and the second coating is formed from a thermally-insulating ceramic material.

In some embodiments, grinding mechanism 102 and controller 104 (shown in FIG. 1) are included in a computer numerical control (CNC) machine (not shown). As described above, computer-executable instructions are stored in memory 106 (shown in FIG. 1) and, when executed by controller 104, the computer-executable instructions cause controller 104 to perform a variety of functions. For example, the computer-executable instructions cause controller 104 to perform at least one of position grinding mechanism 102 against multi-layer coating 116, initiate first removal mode 110, monitor at least one operating parameter (e.g., power, wheel speed, and/or wheel traversal rate) of grinding mechanism 102 during first removal mode 110, evaluate a value of the at least one operating parameter against a predetermined threshold to determine whether second coating layer 126 has been removed, and/or initiate second removal mode 112 after second coating layer 126 has been removed.

Referring to FIG. 2, in operation, grinding mechanism 102 is operable in first removal mode 110 to facilitate removing second coating layer 126 from substrate 118. In first removal mode 110, controller 104 designates at least one fixed operating parameter and a variable operating parameter for grinding mechanism 102. As grinding mechanism 102 traverses across substrate 118, controller 104 monitors the variable operating parameter to determine when second coating layer 126 has been removed from substrate 118. As described above, the first coating is formed from a first material and the second coating is formed from a second material. Because the first and second coatings are formed from different materials, a value of the variable operating parameter changes when grinding mechanism 102 is engaged with the first coating or the second coating.

For example, in the exemplary embodiment, controller 104 designates a grinding wheel speed (i.e., rotations per minute) and a grinding wheel traversal rate across substrate 118 as fixed operating parameters, and power supplied to grinding mechanism 102 as the variable operating parameter. Controller 104 then directs grinding mechanism 102 to operate with the fixed and variable operating parameters. The value of the variable operating parameter is dynamically selected to facilitate maintaining values of the fixed operating parameters. Controller 104 then evaluates the value of the variable operating parameter against a predetermined threshold to determine whether second coating layer 126 has been removed from substrate 118. For example, in the exemplary embodiment, the power required to maintain the wheel speed and/or traversal rate has a first value when grinding mechanism 102 engages second coating layer 126, and has a second value when grinding mechanism 102 engages first coating layer 124. The first value is generally greater than the second value. As such, controller 104 is able to determine when second coating layer 126 has been removed when the power value is less than the predetermined threshold.

Moreover, in operation, first removal mode 110 directs grinding mechanism 102 to grind against second coating layer 126 at a first depth $D_1$ less than a thickness T of second coating layer 126. Specifically, first removal mode 110 directs grinding mechanism 102 to traverse across substrate 118 with a plurality of passes that each grind into multi-layer coating 116 at depth $D_1$ until second coating layer 126 is removed. Alternatively, each pass may grind into multi-layer coating at any depth less than thickness T of second coating layer 126. The number of passes is selected as a function of the variable operating parameter monitored by controller 104. For example, in the exemplary embodiment, controller 104 substantially continuously monitors the power supplied to grinding mechanism 102 during each pass. If the power value at each point along the traversal path of grinding mechanism 102 during a single pass is greater than the predetermined threshold, first removal mode 110 directs grinding mechanism to make another pass. If the power value at points along the traversal path of grinding mechanism 102 during a single pass is both greater than and less than the predetermined threshold, first removal mode 110 directs grinding mechanism 102 to make another pass. If the power value at each point along the traversal path of grinding mechanism 102 during a single pass is less than the predetermined threshold, controller 104 disengages first removal mode 110 and initiates second removal mode 112.

Referring to FIG. 3, in operation, grinding mechanism 102 is operable in second removal mode 112 to facilitate removing first coating layer 124 from substrate 118. Second removal mode 112 is initiated after it is determined that second coating layer 126 (shown in FIG. 2) has been removed from substrate 118. Second removal mode 112 directs grinding mechanism 102 to grind into first coating layer 124 and at least a portion of substrate 118 until a predetermined second grinding depth $D_2$ is reached. Because at least a portion of first coating layer 124 diffuses into substrate 118 over time, predetermined second grinding depth $D_2$ is selected to ensure first coating layer 124 is substantially completely removed from substrate 118. In some embodiments, second removal mode 112 directs grinding mechanism 102 to traverse across substrate 118 with a plurality of passes.

The systems and methods described herein facilitate accurate removal of a multi-layer coating from a substrate. The multi-layer coating is formed from delineated layers of different coating materials having different physical characteristics such that as a grinding mechanism removes the multi-layer coating, an evaluation of when each layer is being engaged by the grinding mechanism is determined based on a value of a variable operating parameter of the grinding mechanism. More specifically, the value of the variable operating parameter is dynamically selected to facilitate maintaining values of fixed operating parameters of the grinding mechanism. The value of the variable operating parameter is then evaluated against a predetermined threshold to continuously determine progress of the coating removal process. As such, the systems and methods described herein facilitate determining an accurate number of machining passes to facilitate reducing substrate material removal, and thus facilitates extending the service life of associated components.

This written description uses examples to disclose the embodiments of the present disclosure, including the best mode, and also to enable any person skilled in the art to practice embodiments of the present disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system for use in removing a multi-layer coating from a substrate, the multi-layer coating including at least one layer of a first coating applied to the substrate and at least one layer of a second coating applied over the first coating, the first coating formed from a first material and the second coating formed from a second material different from the first material, said system comprising:
   a grinding mechanism configured to remove the multi-layer coating from the substrate; and
   a controller coupled in communication with said grinding mechanism, said controller configured to:
      position said grinding mechanism against the multi-layer coating;
      initiate a first removal mode that directs said grinding mechanism to traverse across the substrate;
      monitor a variable operating parameter of said grinding mechanism during the first removal mode, the variable operating parameter being power supplied to said grinding mechanism; and
      evaluate a value of the variable operating parameter against a predetermined threshold to determine whether the second coating has been removed from the substrate.

2. The system in accordance with claim 1, wherein said controller is further configured to initiate the first removal mode that directs said grinding mechanism to grind into the second coating at a depth less than a thickness of the second coating.

3. The system in accordance with claim 2, wherein said controller is further configured to initiate the first removal mode that directs said grinding mechanism to traverse across the substrate with a plurality of passes that each grind into the multi-layer coating at the depth less than the thickness of the second coating until the value of the variable operating parameter is outside the predetermined threshold.

4. The system in accordance with claim 3, wherein said controller is further configured to substantially continuously monitor the variable operating parameter along a traversal path of said grinding mechanism, wherein the first removal mode initiates another of the plurality of passes until values of the variable operating parameter along the traversal path are each outside the predetermined threshold.

5. The system in accordance with claim 1, wherein said controller is further configured to:
   designate at least one fixed operating parameter of said grinding mechanism; and
   direct said grinding mechanism to operate at the value of the variable operating parameter that is dynamically selected to facilitate maintaining a value of the at least one fixed operating parameter.

6. The system in accordance with claim 1, wherein said controller is further configured to initiate a second removal mode after it is determined that the second coating has been removed, the second removal mode configured to direct said grinding mechanism to remove the first coating from the substrate.

7. The system in accordance with claim 6, wherein said controller is further configured to initiate the second removal mode that directs said grinding mechanism to grind into at least the first coating until a predetermined grinding depth is reached.

8. A method of removing a multi-layer coating from a substrate, the multi-layer coating including at least one layer of a first coating applied to the substrate and at least one layer of a second coating applied over the first coating, the first coating formed from a first material and the second coating formed from a second material different from the first material, said method comprising:
 positioning a grinding mechanism against the multi-layer coating, the grinding mechanism configured to remove the multi-layer coating from the substrate;
 initiating a first removal mode that directs the grinding mechanism to traverse across the substrate;
 monitoring a variable operating parameter of the grinding mechanism during the first removal mode, the variable operating parameter being power supplied to the grinding mechanism; and
 evaluating a value of the variable operating parameter against a predetermined threshold to determine whether the second coating has been removed from the substrate.

9. The method in accordance with claim 8, wherein initiating a first removal mode comprises initiating the first removal mode that directs the grinding mechanism to grind into the second coating at a depth less than a thickness of the second coating.

10. The method in accordance with claim 9, wherein initiating a first removal mode comprises initiating the first removal mode that directs the grinding mechanism to traverse across the substrate with a plurality of passes that each grind into the multi-layer coating at the depth less than the thickness of the second coating.

11. The method in accordance with claim 8 further comprising:
 designating at least one fixed operating parameter of the grinding mechanism; and
 directing the grinding mechanism to operate at the value of the variable operating parameter that is dynamically selected to facilitate maintaining a value of the at least one fixed operating parameter.

12. The method in accordance with claim 8 further comprising initiating a second removal mode after it is determined that the second coating has been removed, the second removal mode configured to direct the grinding mechanism to remove the first coating from the substrate.

13. The method in accordance with claim 12, wherein initiating a second removal mode comprises initiating the second removal mode that directs said grinding mechanism to grind into at least the first coating until a predetermined grinding depth is reached.

14. A non-transitory computer-readable medium having computer-executable instructions embodied thereon for use in removing a multi-layer coating from a substrate, the multi-layer coating including at least one layer of a first coating applied to the substrate and at least one layer of a second coating applied over the first coating, the first coating formed from a first material and the second coating formed from a second material different from the first material, wherein, when executed by a controller, the computer-executable instructions cause the controller to:
 position a grinding mechanism against the multi-layer coating;
 initiate a first removal mode that directs the grinding mechanism to traverse across the substrate;
 monitor a variable operating parameter of the grinding mechanism during the first removal mode, the variable operating parameter being power supplied to the grinding mechanism; and
 evaluate a value of the variable operating parameter against a predetermined threshold to determine whether the second coating has been removed from the substrate.

15. The non-transitory computer readable medium in accordance with claim 14 further comprising computer-executable instructions that cause the controller to:
 initiate the first removal mode that directs the grinding mechanism to grind into the second coating at a depth less than a thickness of the second coating.

16. The non-transitory computer readable medium in accordance with claim 15 further comprising computer-executable instructions that cause the controller to:
 initiate the first removal mode that directs the grinding mechanism to traverse across the substrate with a plurality of passes that each grind into the multi-layer coating at the depth less than the thickness of the second coating until the value of the variable operating parameter is outside the predetermined threshold.

17. The non-transitory computer readable medium in accordance with claim 16 further comprising computer-executable instructions that cause the controller to:
 substantially continuously monitor the variable operating parameter along a traversal path of the grinding mechanism, wherein the first removal mode initiates another of the plurality of passes until values of the variable operating parameter along the traversal path are each outside the predetermined threshold.

18. The non-transitory computer readable medium in accordance with claim 14 further comprising computer-executable instructions that cause the controller to:
 designate at least one fixed operating parameter of the grinding mechanism; and
 direct the grinding mechanism to operate at the value of the variable operating parameter that is dynamically selected to facilitate maintaining a value of the at least one fixed operating parameter.

19. The non-transitory computer readable medium in accordance with claim 14 further comprising computer-executable instructions that cause the controller to:
 initiate a second removal mode after it is determined that the second coating has been removed, the second removal mode configured to direct the grinding mechanism to remove the first coating from the substrate.

20. The non-transitory computer readable medium in accordance with claim 19 further comprising computer-executable instructions that cause the controller to:
 initiate the second removal mode that directs the grinding mechanism to grind into at least the first coating until a predetermined grinding depth is reached.

* * * * *